US011981010B2

(12) United States Patent
Marks

(10) Patent No.: US 11,981,010 B2
(45) Date of Patent: May 14, 2024

(54) HIGH EFFICIENCY TORSION SPRING TACKER

(71) Applicant: WORKTOOLS, INC., Chatsworth, CA (US)

(72) Inventor: Joel S. Marks, Sherman Oaks, CA (US)

(73) Assignee: WorkTools, Inc., Chatsworth, CA (US)

( * ) Notice: Subject to any disclaimer, the term of this patent is extended or adjusted under 35 U.S.C. 154(b) by 59 days.

(21) Appl. No.: 17/942,098

(22) Filed: Sep. 9, 2022

(65) Prior Publication Data

US 2023/0001557 A1 Jan. 5, 2023

Related U.S. Application Data

(63) Continuation of application No. 16/858,621, filed on Apr. 25, 2020, now Pat. No. 11,472,014.

(60) Provisional application No. 62/895,475, filed on Sep. 3, 2019, provisional application No. 62/843,553, filed on May 5, 2019.

(51) Int. Cl.
*B25C 5/11* (2006.01)

(52) U.S. Cl.
CPC .................................... *B25C 5/11* (2013.01)

(58) Field of Classification Search
CPC ........... B25C 5/0242; B25C 5/11; B25C 5/00; B25C 5/06
See application file for complete search history.

(56) References Cited

U.S. PATENT DOCUMENTS

| | | | |
|---|---|---|---|
| 1,655,275 | A | 1/1928 | La Place |
| 1,919,373 | A | 7/1933 | Krantz |
| 2,087,242 | A | 7/1937 | Bunnell |
| 2,137,642 | A | 11/1938 | Cavanagh |
| 2,326,540 | A | 8/1943 | Krantz |
| 2,493,640 | A | 1/1950 | Peterson |
| 2,726,391 | A | 12/1955 | Pilblad |
| 2,755,474 | A | 7/1956 | Spencer |
| 2,769,174 | A | 11/1956 | Libert |
| 2,884,636 | A | 5/1959 | Abrams |
| 3,034,128 | A | 5/1962 | Robbins |

(Continued)

FOREIGN PATENT DOCUMENTS

| | | |
|---|---|---|
| CH | 255111 | 6/1948 |
| CN | 110541903 A | 12/2019 |

(Continued)

OTHER PUBLICATIONS

GB, 2013786.5 Search Report, dated Dec. 1, 2020.

(Continued)

*Primary Examiner* — Veronica Martin
(74) *Attorney, Agent, or Firm* — Paul Y. Feng; One LLP

(57) ABSTRACT

A spring energized fastening tool with compact, rigid, low friction working elements is disclosed. A torsion power spring includes forward extending arms with the arms pressing each other proximate a front distal end of the spring. A cantilevered lever links to a handle and engages the spring adjacent to the striker. A bottom loading staple track unlatches and opens through a simple pulling-out action. Structures are provided to enable fitment with a formed sheet metal handle and housing. The fastening tool is particularly simple to assemble, powerful, and of low operating effort.

18 Claims, 7 Drawing Sheets

(56) References Cited

U.S. PATENT DOCUMENTS

| | | | |
|---|---|---|---|
| 3,103,012 | A | 9/1963 | Kohen et al. |
| 3,610,505 | A | 10/1971 | Males et al. |
| 3,758,016 | A | 9/1973 | Olney et al. |
| 3,940,044 | A | 2/1976 | LaPointe |
| 3,948,426 | A | 4/1976 | La Pointe |
| 4,126,260 | A | 11/1978 | Mickelsson |
| 4,367,833 | A | 1/1983 | Kenney |
| 4,450,998 | A | 5/1984 | Ruskin |
| 4,452,388 | A | 6/1984 | Fealey |
| 4,463,890 | A | 8/1984 | Ruskin |
| 4,629,108 | A | 12/1986 | Judge |
| 5,328,075 | A | 7/1994 | Marks |
| 5,335,838 | A | 8/1994 | Harris et al. |
| 5,335,839 | A | 8/1994 | Fealey |
| 5,356,063 | A | 10/1994 | Perez |
| 5,407,118 | A | 4/1995 | Marks |
| 5,497,932 | A | 3/1996 | Brewer et al. |
| 5,664,722 | A | 9/1997 | Marks |
| 5,699,949 | A | 12/1997 | Marks |
| 5,816,470 | A | 10/1998 | Plato et al. |
| 5,988,478 | A | 11/1999 | Marks |
| 6,145,728 | A | 11/2000 | Marks |
| 6,244,491 | B1 | 6/2001 | Kandasamy et al. |
| 6,550,661 | B2 | 4/2003 | Aoki |
| 6,626,346 | B2 | 9/2003 | Jairam et al. |
| 6,789,719 | B2 | 9/2004 | Shor |
| 6,918,525 | B2 | 7/2005 | Marks |
| 6,966,479 | B2 | 11/2005 | Tanaka et al. |
| 7,097,086 | B2 | 8/2006 | Joyce et al. |
| 7,097,088 | B2 | 8/2006 | Shor |
| 7,118,019 | B2 | 10/2006 | Marks |
| 7,121,444 | B2 | 10/2006 | Joyce |
| 7,124,922 | B2 | 10/2006 | Marks |
| 7,124,924 | B2 | 10/2006 | Marks |
| 7,140,526 | B2 | 11/2006 | Matsukawa |
| 7,178,709 | B2 | 2/2007 | Marks |
| 7,234,621 | B2 | 6/2007 | Marks |
| 7,243,832 | B2 | 7/2007 | Jiang |
| 7,299,960 | B1 | 11/2007 | Marks |
| 7,387,227 | B1 | 6/2008 | Jiang et al. |
| 7,395,955 | B2 | 7/2008 | Zins et al. |
| 7,464,845 | B2 | 12/2008 | Chou |
| 7,513,406 | B2 | 4/2009 | Marks |
| 7,540,400 | B2 | 6/2009 | Zins et al. |
| 7,681,771 | B2 | 3/2010 | Kandasamy et al. |
| 7,708,179 | B2 | 5/2010 | Marks |
| 7,748,589 | B2 | 7/2010 | Marks |
| 8,978,952 | B2 | 3/2015 | Marks |
| 9,962,822 | B2 | 5/2018 | Marks |
| 2005/0098604 | A1* | 5/2005 | Marks ..................... B25C 5/025 227/134 |
| 2009/0114698 | A1* | 5/2009 | Marks ....................... B25C 5/11 227/139 |
| 2017/0239798 | A1 | 8/2017 | Marks |
| 2019/0160641 | A1 | 5/2019 | Wang |
| 2019/0240823 | A1 | 8/2019 | Lai et al. |
| 2019/0337133 | A1 | 11/2019 | Yeh |

FOREIGN PATENT DOCUMENTS

| | | | |
|---|---|---|---|
| GB | 2229129 | A | 4/1999 |
| JP | 2019-130663 | A | 8/2019 |
| TW | I635936 | B | 9/2018 |
| TW | I641454 | B | 11/2018 |

OTHER PUBLICATIONS

TW, 109129386 Search Report, dated Apr. 21, 2022.

Taiwan Associate Reporting Letter dated Jun. 7, 2022 with English translation of TW IPO Official Letter/Search Report dated Apr. 26, 2022, US Pat App Pub No. 2017/0239798 (Marks).

Vicky Binnie, UKIPO Examiner, Search Report, dated Dec. 1, 2020, pp. 1-2.

* cited by examiner

FIG. 1
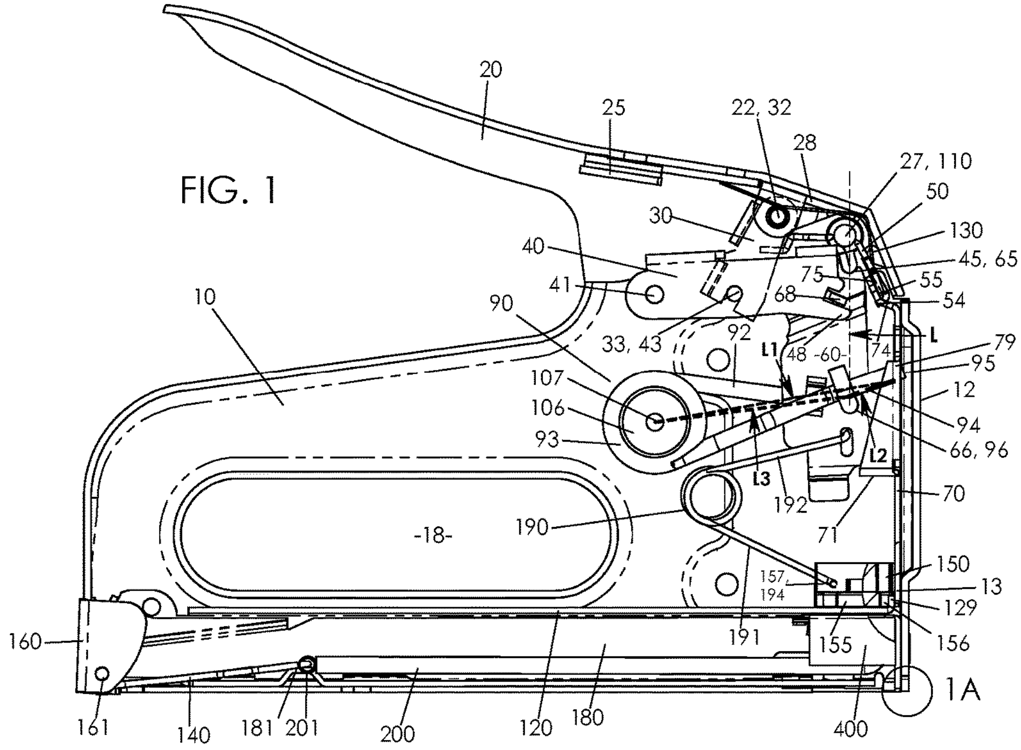
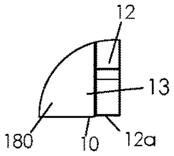
FIG. 1A
FIG. 2
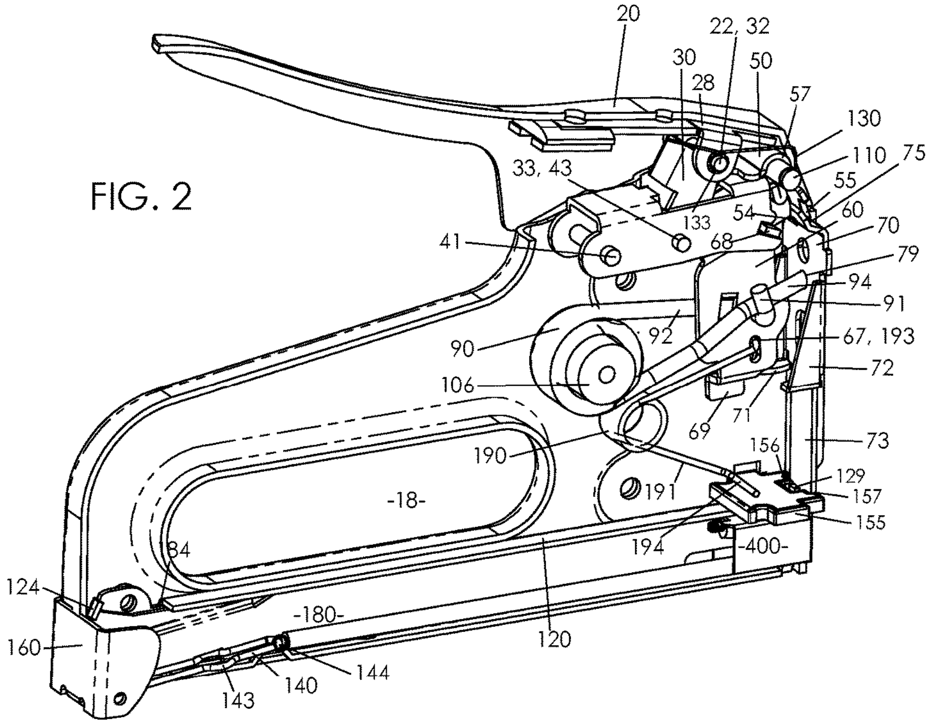

FIG. 3
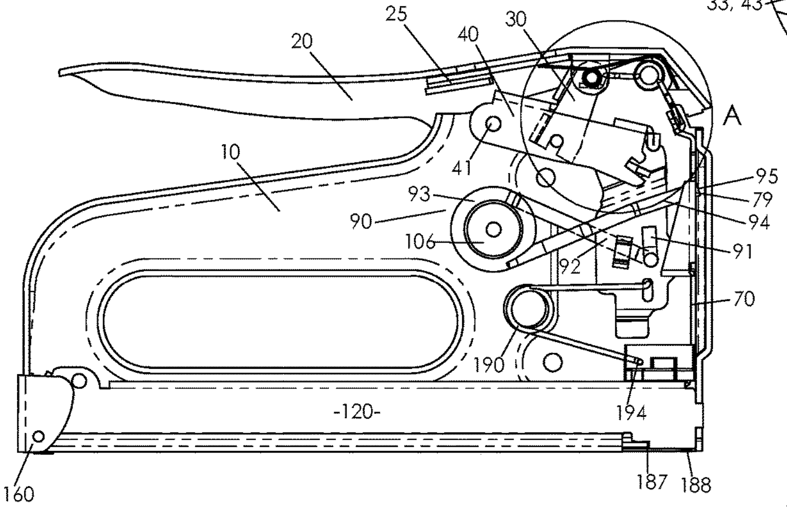
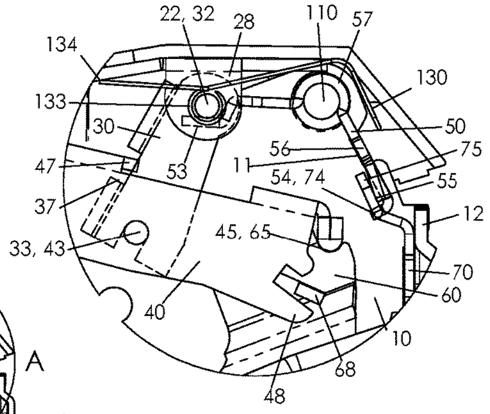
FIG. 3A
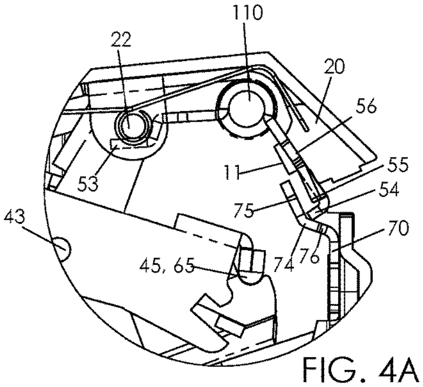
FIG. 4A
FIG. 4
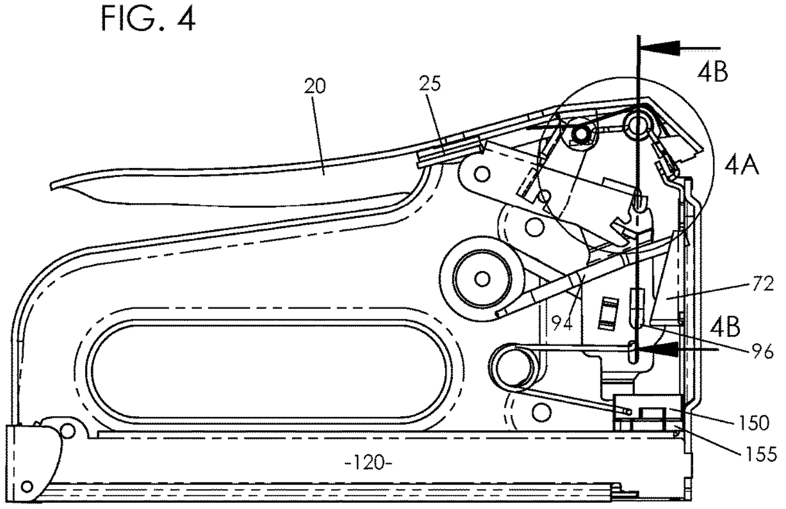
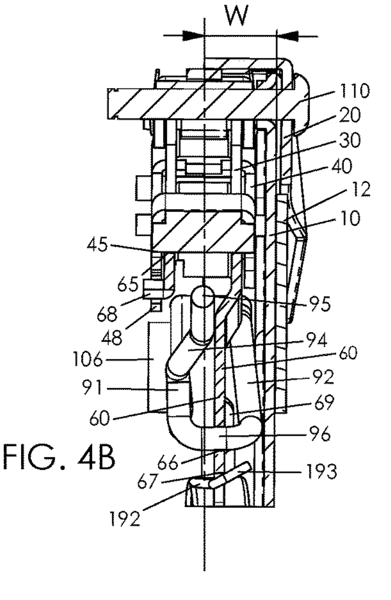
FIG. 4B

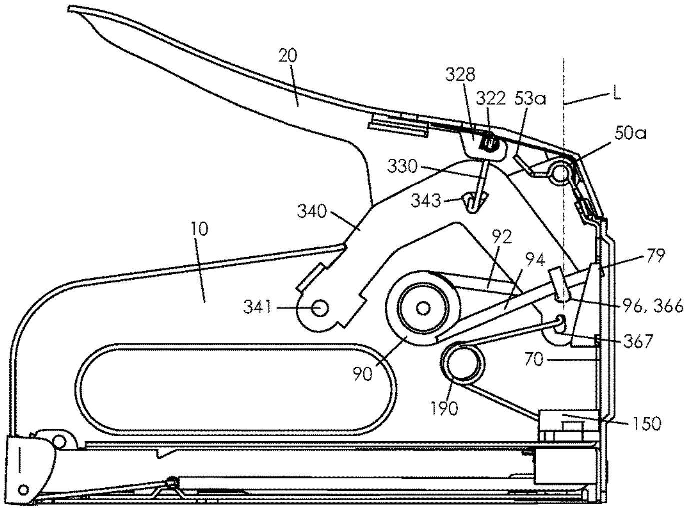
FIG. 16
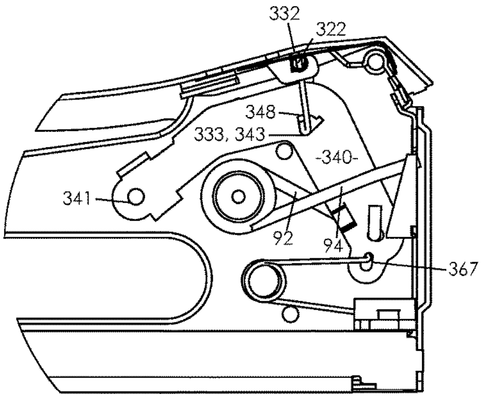
FIG. 17
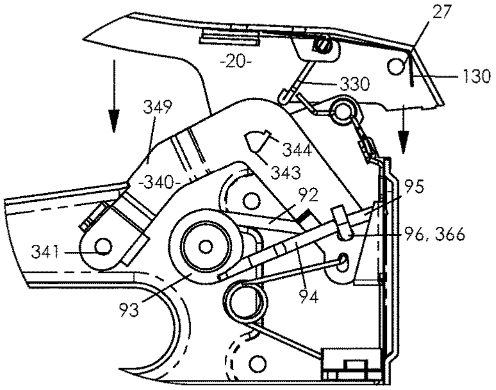
FIG. 18
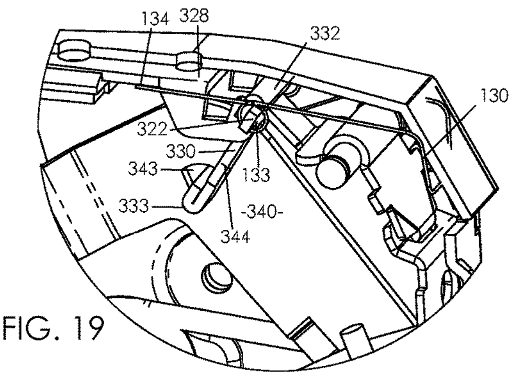
FIG. 19
FIG. 20
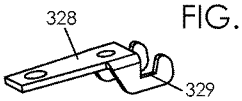
FIG. 21
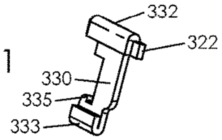
FIG. 22
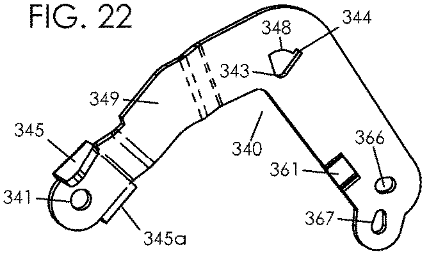
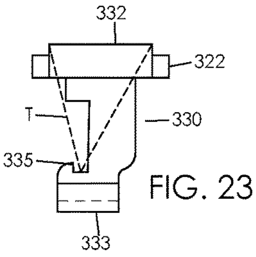
FIG. 23

HIGH EFFICIENCY TORSION SPRING TACKER

CROSS-REFERENCE TO RELATED APPLICATIONS

This application is a continuation of co-pending application Ser. No. 16/858,621, filed Apr. 25, 2020, that claims priority from provisional application No. 62/895,475, filed Sep. 3, 2019, and from provisional application No. 62/843,553, filed May 5, 2019, the contents of all of which are hereby incorporated by reference.

FIELD OF THE INVENTION

The present invention relates to spring energized tackers. More precisely, the present invention relates to a tacker with improved efficiency of assembly and operation.

BACKGROUND

Staple gun tackers and the like with energy storage via a power spring are known. A spring is deflected to store energy for sudden release to impact and drive a fastener into a work piece. Most commonly associated with manually operated hand tools such as a staple gun, a power spring based driving tool may also operate with a motorized system. A power spring may include a compression type, elongated bar, or torsion wire spring. With manual staple guns, a tool housing may include formed sheet metal, die cast, or resin molded. The sheet metal construction has most often been associated with compression springs and, less often, bar springs. One example of a sheet metal bodied staple gun is the T-50 brand of tacker, while many other such tackers are also known. Torsion springs are generally associated with molded or die cast housings; these are effective for providing the supports and guides for operating torsion springs.

The various springs may be used in a low start tacker, wherein the striker starts an operating cycle from a normal rest position in front of the staple or fastener track, and a high start where the striker normally rests above the staple track to start an operating cycle. In either case, there must be a release system to suddenly release the striker to instantly move down under the spring bias to eject a fastener. It is common that the release for one or both are imprecise and a source of force-adding friction.

A guide track for staples or fasteners is located along a bottom of the tool. Staples may be inserted from the rear or at the bottom among other known arrangements. Rear loading designs are prone to jamming since the staples cannot be easily accessed near the track front where jams may occur. Bottom loading exposes the full staple storage area for access as the track slide out rearward. A track pull with a latching structure is required to hold the track in its operative position. Such latches can be unwieldy and require aesthetic compromise.

SUMMARY OF THE INVENTION

In various preferred embodiments, the present invention is directed to a spring energized fastening tool with compact, low friction working elements. In the preferred high start embodiment, a torsion power spring includes at least two forward extending arms with the arms pressing each other proximate a front distal end of the spring. One embodiment has a rigid and movable four bar assembly that links the handle to the power spring and deflects the spring to separate and deflect the arms immediately upon pressing the handle. A further embodiment has a cantilevered lever engaging the spring adjacent to the striker. A release link preferably nests within a front portion of the handle whereby the release moves directly with the handle about a common pivot hinge during a release portion of the handle stroke. This structure provides reliable and repeatable release action.

Various preferred structures are provided to enable fitment with a formed sheet metal handle and housing. The illustrated structures are compatible to fit within the confines of a standard T-50 type tacker, for example, while also being well suited to other sheet metal, molded and die cast bodied tackers. As fitted, the fastening tool is particularly simple to assemble, powerful, and of low operating effort.

In the preferred embodiment, a bottom loading staple track is compatible with a sheet metal housing among other housing structures. The track unlatches and opens through a simple pulling-out action.

BRIEF DESCRIPTION OF THE DRAWINGS

FIG. 1 is a partially cross-sectioned, side elevational view of a fastening tool in a rest condition according to one embodiment.

FIG. 1A is a detail view of FIG. 1 showing a lower front corner area.

FIG. 2 is a rear, top perspective view of the fastening tool of FIG. 1.

FIG. 3 is the tool of FIG. 1 in a pressed condition.

FIG. 3A is a detail view of a top front area of the tool of FIG. 3.

FIG. 4 is the tool of FIG. 1 in a pre-release condition.

FIG. 4A is a detail view of a top front area of the tool of FIG. 4.

FIG. 4B is a partial transverse cross-sectional view of a front area of the tool of FIG. 4.

FIG. 16 is a side elevational view of a fastening tool in a rest condition showing operative parts according to an alternative embodiment.

FIG. 17 is a cropped side elevational view of the tool of FIG. 16 in a pre-release condition.

FIG. 18 shows an assembly step of an upper handle sub-assembly to a lower tacker structure.

FIG. 19 is a detail view in perspective showing a handle and lever linkage during an assembly step.

FIG. 20 is a rear top perspective view of a rear handle link pivot support according to the alternative embodiment.

FIG. 21 is rear perspective view of a handle to lever link according to the alternative embodiment.

FIG. 22 is a side, rear perspective view of a lever according to the alternative embodiment.

FIG. 23 is a rear elevational view of the link of FIG. 21.

DETAILED DESCRIPTION OF THE PREFERRED EMBODIMENTS

Figure 5:
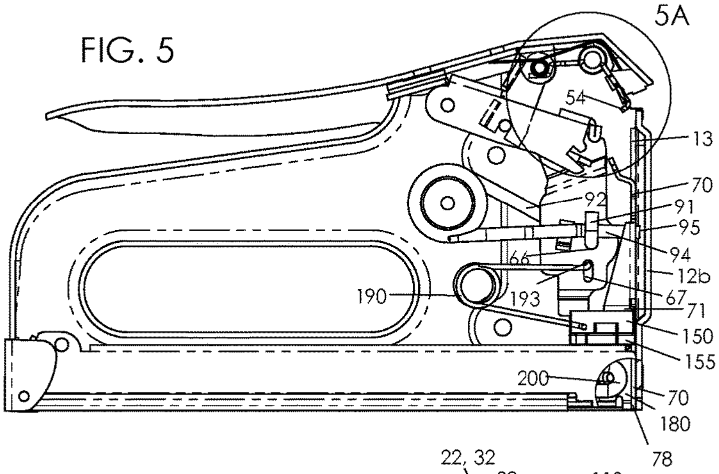
FIG. 5 is the tool of FIG. 1 in a released condition.

The present invention is directed to a compact, efficient spring energized tacker that may operate and be fitted within a formed sheet housing body or like standardized body. The drawings show a preferred embodiment tacker that has a body sized and shaped similarly to a known commercially available tacker operable with T-50 style staples up to ½" or 9/16" long. However, the features of the present invention function with tackers of other shapes, sizes, and constructions including molded resin and die cast. For example, one or both of housing 10 and handle 20 may include sheet metal, molded resin, and/or die cast metal. In describing a tacker, such term may include staple guns, nail guns and equivalent fastening tools whether motorized or manually powered to energize a power spring.

In the preferred embodiment tacker of FIG. 1, for example, the length of the tool from the rear end to front end is 7¼ inches long. In FIG. 4B, housing 10 totals approximately 0.9 inch wide at the dimension W (W being doubled from approximately 0.45 inch to include the opposed housing side that is not shown). Other sizes, shapes and dimensions of the housing, handle, and other operating parts are contemplated.

In the assembly drawings FIG. 1 to FIG. 6, a right side of the housing is removed and handle 20 is depicted in cross-section to show internal components. Housing 10 has a front (right side of FIG. 1), a rear, a top, and a bottom. FIG. 1 shows a rest condition of the tacker. Handle 20 is in an upper position above housing 10, and it is pivotally attached to housing 10 at a handle/housing pivot, here hinge pin 110 near the top of the housing. At the bottom of housing 10 is a staple track 180 that supports staples biased forward by spring-driven pusher 400. Handle link pivot support 28 includes pivot hinge 22. Link 30 has pivot 32 fitted to hinge 22 defining an upper end or equivalent location of a linkage assembly. A lower end of link 30 includes slot 33 to engage hinge 43 of lever 40. See also FIGS. 7 to 15 for the individual components. Lever 40 includes pivot tab 45 to engage groove 65 of link bar 60. Link bar 60 engages pivot, hinge pin or hinge element 96 of power spring 90 at link bar hole 66. Hole 66 may define a lower end or equivalent structure of the linkage assembly that begins at hinge 22. The linkage lower end is below and substantially forward from the linkage upper end. As seen in FIG. 1, imaginary vertical line L between the pivot structures of hinge pin 110 and element 96 is well forward of hinge 22; as illustrated, line L is close to the forward structure or blade of striker 70.

As seen in FIGS. 2 and 3, the power spring 90 pivots about mandrel 106. Power spring arm 94 extends from spring coil 93 to spring arm tip 95. Tip 95 engages opening 79 of striker 70, preferably directly as shown or through another linking member in the immediate local position. Latch 50 is preferably pivotally attached to the tool assembly by recess 57 at handle hinge pin 110. In FIG. 3A, tab 54 of the latch 50 engages opening or edge 74 of the striker 70 to selectively immobilize the striker.

The motions of the parts described above are shown by comparing FIGS. 1 and 3. Pressing handle 20 about hinge pin 110 causes link 30 to move downward. Lever 40 pivots about hinge 41 to cause link bar 60 to move downward. The linkage assembly thus forces spring arm 92 to deflect downward or equivalent direction. Striker 70 cannot move downward from the action at latch 50, so spring arm 94 remains in an upper position as seen in the pressed position of FIG. 3. Power spring 90 becomes deflected with spring arm 92 spaced away from spring arm 94. Power spring 90 is thereby energized for an operating cycle to eject fasteners from track 180. In FIG. 3A, hinge pin 22 has just made contact with tab 53 of latch 50 while handle 20 is in a low but not lowest position. Moving the handle farther toward the lowest position of FIG. 4 starts the latch 50 rotating to disengage striker 70 as described next.

In FIGS. 4 and 4A, the pre-release condition has latch 50 disengaged from striker 70. Tab 54 is moved away from opening 74 so striker 70 is now free to move down. It is preferred that the release of striker 70 occur as close as possible to the handle's lowest position. This handle lowest position, FIG. 4, is defined by contact to bumper 25 of handle 20 against a surface of housing 10 or equivalent action. Thus, there is minimal jump or jerking of the handle 20 upon release for reduced operator fatigue. Further, the force of an operator's hand presses directly on the housing body 10 through bumper 25 to help hold down the tacker as it fires. To move the latch 50 as described, the pin or equivalent structure of hinge 22 presses tab 53 of the latch. The latch 50 rotates about hinge pin 110 to slide tab 54 out from the striker 70. The preferred latch motion is precise, reliable and repeatable since it is directly tied to a short portion of the handle motion; the latch begins to move only during a late part of the handle stroke so its release motion is relatively fast during the relevant handle motion. Specifically, the latch release motion occurs only between the pressed handle position of FIG. 3 and the pre-release position of FIG. 4, this being about ½" at the handle rear for the exemplary model shown. With all of the latch release motion concentrated near the end-of-stroke, any tolerance variation of the pre-release handle position will be confined to a pre-determined position within this small portion of the handle motion. The latch 50 operates about a common pivot to the handle 20 so there is no tolerance variation of intervening components; the latch and handle move in unison during release. There is also minimal net vertical force on hinge pin 110 since handle 20 and latch 50 pull oppositely on the pin. Therefore, the pin 110 can rotate with handle 20 about its mounting on housing 10 with little force and friction at the housing mounting. This unified motion reduces friction between the latch 50 and the pin 110 as demonstrated in a working model and through empirical testing.

Figure 9:
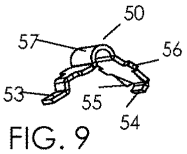
FIG. 9 is a rear perspective view of a release latch.
Figure 8:
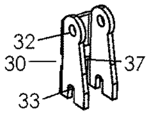
FIG. 8 is a front perspective view of a handle to lever link.

In FIGS. 4A, 9, the exemplary embodiment tab 54 has a preferred acute angle of approximately 89 degrees relative to an imaginary radial line extending from hinge pin 110. An angle within approximately 2 to 5 degrees of 90 degrees can be suitable to hold the latch 50 stable on the striker with minimal force on the latch required to move the latch as described. Through empirical observation, with the exemplary angle of 89 degrees, in the release action, rotating latch 50 under load as between FIGS. 3 and 4, adds less than 1 lb., being about ½ lb., to a peak handle force. This force is effectively undetectable to a user. When measured at the handle rear in the position of FIG. 4, the required total force is approximately 15 to 16 lbs. to provide power sufficient to drive ½-inch T-50 type staples flush in common construction wood applications, for example, Douglas fir wood. Therefore, the tacker provides tremendous staple driving energy while the handle deflection effort as perceived by the user is very low and smooth.

The linkage between handle 20 and striker 70 is substantially rigid through the structures described here. In the spring rest condition of FIGS. 1, 14A and 14C, pivot/support element 96 presses spring arm 94 to hold power spring 90 preloaded. FIGS. 3 and 14B show the power spring deflected and energized. Pivot element 96 is preferably a laterally extending portion of a spring arm and may be referred to as a "location of preload" or of preload force for the spring, such location being spaced from coil 93 to enable a preload torque on the coil. The lateral direction is into the page in FIGS. 1 and 18, being preferably, but not necessarily, perpendicular to arm 94 in FIG. 14C. This spring arm crossing, FIG. 14C, may be at shallower angles. The pressing is preferably directly between the respective arms 92, 94 while the arms may also press in the local area through further elements. Pivot element 96, preferably but not necessarily along with tip 91, forms a hook to hold the spring in the preloaded condition at the location of preload. As the handle is pressed by the user, pivot element 96 is forced downward. The force on striker 70 at tip 95 increases from near zero to a final maximum at the pre-release position of FIG. 4. This force is a torque on spring arm 94. The spring arms 92, 94 are of a functionally and intentionally resilient material being normally of a same wire as the coil. However, flexing forward of the location of preload is not useful as discussed below; hence the length of the portion forward of pivot element 96 is minimized in the preferred embodiment.

To demonstrate this minimized forward portion length, in FIGS. 1, 14A to 14C, spring arm 94 flexes in proportion to the length of the unsupported cantilevered segment between pivot/support element 96 and the striker location at tip 95. This effect is illustrated in FIG. 14B: in phantom lines, support element 96 is pressed down slightly from FIG. 14A until element 96 no longer presses spring arm 94. Spring arm 94 flexes as shown until support element 96 is no longer in contact at S1. With the loss of support at S1, the support shifts farther forward to the striker at S2. This flexing to remove the preload translates to handle 20 as a mushy start to the stroke and lost energy input as discussed below relative to FIG. 35. It is thus desirable to have S1 be as close as practicable to S2 as shown and separately discussed to minimize the effect of this flexing.

As illustrated in FIG. 1, a distance between mandrel pin 107 or equivalently a central axis of the coil, or a spring coil central location, and striker 70 is approximately 2.06 to 2.11 inches. Most preferably, this is a distance of approximately 2.11 inches, and is denoted by dashed line L1 in FIG. 1. In this context, the striker location is defined as the rear plane of the blade of the striker at engaged opening 79. From support element 96 to striker 70 is a distance of approximately 0.43 inch, as denoted by line L2 in FIG. 1. L3 is the distance between mandrel pin 107 and support element 96, and L3 in this embodiment is approximately 1.70 inch. There is a distance ratio L3/L1 of about 80% (i.e., 1.70 in./2.11 in.). Therefore, the location of preload is forward of the coil location about 80% of the length of dashed line L1. In FIG. 4 this distance places support element 96 adjacent to striker 70 in the pressed spring condition, preferably clear of sidewalls 72 or other striker structure by not more than one spring wire diameter, although other spacings to the striker are contemplated. A distance ratio L3/L1 of more than 50% is preferable, while a distance ratio of more than about 60 or 70%, is more preferable to have spring arm 92 terminate adjacent the striker and thereby see the benefits described below, based on empirical observation. Other dimensions are contemplated in proportion to other overall tool sizes. The foregoing ratios or proportions are with reference to the rest position of FIG. 1 although they are not substantially different in the released position of FIG. 5.

Flexing of cantilevered spring arm 94 as described above is felt as a "dead bounce" at the handle—a mushy feel that is minimized in the present invention as discussed above regarding FIG. 14B. Based on empirical observation and mechanical principles, this flex is a waste of handle travel and useable energy input as illustrated in the x-y plot of FIG. 35 discussed in further detail below. With such flex minimized, handle 20 is effectively rigidly linked to power spring 90 at a location just approximately 0.43 inch from striker 70 through the four bar style cantilevered linkage, or an alternative linkage arrangement, discussed below. With the short cantilever L2 of the "beam" of spring arm 94 as described, there is minimal beam flexing and no perceived dead bounce. Therefore, user effort on the handle is perceptibly reduced, and the smooth operation of the handle greatly improves the feel of the tool for the user.

Figure 14A:
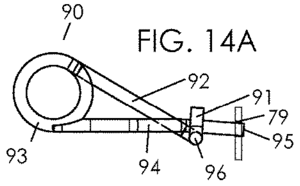
FIG. 14A is a side elevational view of a power spring in a rest condition.
Figure 14B:
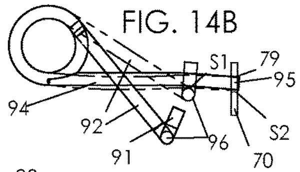
FIG. 14B is the spring of FIG. 14A with the spring partly deflected in phantom and the spring in a pressed condition.
Figure 14C:
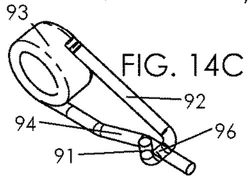
FIG. 14C is a top perspective view of the spring of FIG. 14A.

FIGS. 14A to 14C show various views of a preferred embodiment power spring 90. In FIGS. 14A and 14C power spring 90 is in a preloaded rest condition. Pivot/support element 96 is pressing spring arm 94 in proportion to a preload selected for the particular power spring characteristics. Accordingly, there is a free position (i.e., unflexed) for the spring wherein spring arm 92 is preferably angled upward and pivot element 96 is spaced above arm 94 relative to the view of FIG. 14A. A pre-assembly step has link bar 60 (FIGS. 1, 2, 12) assembled to power spring 90 with pivot element 96 passing through hole 66 in link bar 60. In the pre-assembly step, the spring arms are then forcibly moved from the free position to the position depicted in FIGS. 14A and 14C to form a sub-assembly of link bar 60 and power spring 90 wherein the spring is preloaded. Tip 91 of power spring 90 preferably passes beside spring arm 94 to secure spring arm 94 on pivot element 96 and to hold the assembly stable. The assembly preferably has tip 91, link bar 60, and spring arm 94 laterally adjacent each other along pivot element 96.

An alternative embodiment tool may use a power spring in the form of a single or assembly of flat bar springs instead of a coiled wire torsion spring. The bar spring includes cantilevered legs and is preloaded similar to FIGS. 14A to 14C. The bar spring is mounted to a mandrel 107 or like fixture inside the housing.

In the present embodiment tool, a "four bar" or equivalent rigid linkage forms the linkage assembly to connect the rigid steel handle or equivalent rigid structure to pivot element 96 of power spring 90. In the four bar assembly, lever 40 is pivotally mounted at its rear at hinge 41, depicted in FIG. 1. Link 30 presses lever 40 toward a central portion of lever 40 at hinge 43 and the lever presses link bar 60 at a front distal end of lever 40. Lever 40 is cantilevered forward from its links at hinges 41 and 43 and therefore lever 40 can extend forward to a striker proximate position. In this manner, a vertical linear motion from the handle at link hinge 22 may be enhanced at pivot tab 45, and thus on pivot element 96 or equivalent structure, through cantilevered lever 40. As shown between FIGS. 1 and 3, the vertical travel at link hinge 22 is about doubled at pivot tab 45 since the lever is pressed near its center. However, if hinge 41 were located farther rearward in housing 10, this doubled travel decreases, with a factor of 1.1 still allowing usable lever geometries. Spring pivot element 96 and lever pivot tab 45 are substantially vertically aligned so pivot element 96 maintains the preferable, at least 80% distance ratio discussed above. Thus, pivot element 96 is also proximate the striker as described.

All of the linking elements of the linkage assembly described here may be made of steel so there is no obvious or perceptible give or play in the system beyond that used to store spring energy. It is apparent from the above geometries that handle 20 should rigidly link to power spring 90 at a most forward position of the power spring. As shown in FIG. 1, this link at the location of preload adjacent to pivot element 96 is substantially aligned vertically with handle hinge 110, indicated by vertical line L in FIG. 1, whereby there is a position of line L that passes through or near tangent with both pivot element 96 and hinge 110. Described another way, line L is substantially vertically coincident with each of hinge 110 and pivot element 96 (preload location). Similar considerations apply to FIG. 16 for example. Similarly, link bar 60 extends vertically in or near alignment below handle hinge 110, being vertically coincident in this alignment as shown wherein a top view has some structures of hinge 110 overlapping structures of element 96.

In the four bar system depicted in FIGS. 1, 2 and discussed above, there is a rear bar including the structure of housing 10 supporting spring mandrel 106 and hinge 41, a front bar in the form of link bar 60, a top bar being lever 40, and a bottom bar being spring arm 92. Link bar 60 is pivotally guided within this four-bar system by pivot element 96 of the power spring, FIG. 4B. The torsion spring as described is thus particularly suited for the present four bar system. Spring arm 92 provides both an interface to energize the spring and also a functionally rigid member of the four bar system to guide the lower end of link bar 60. These combined functions are not possible, for example, with a compression spring which is inherently unstable in lateral directions.

Figure 35:
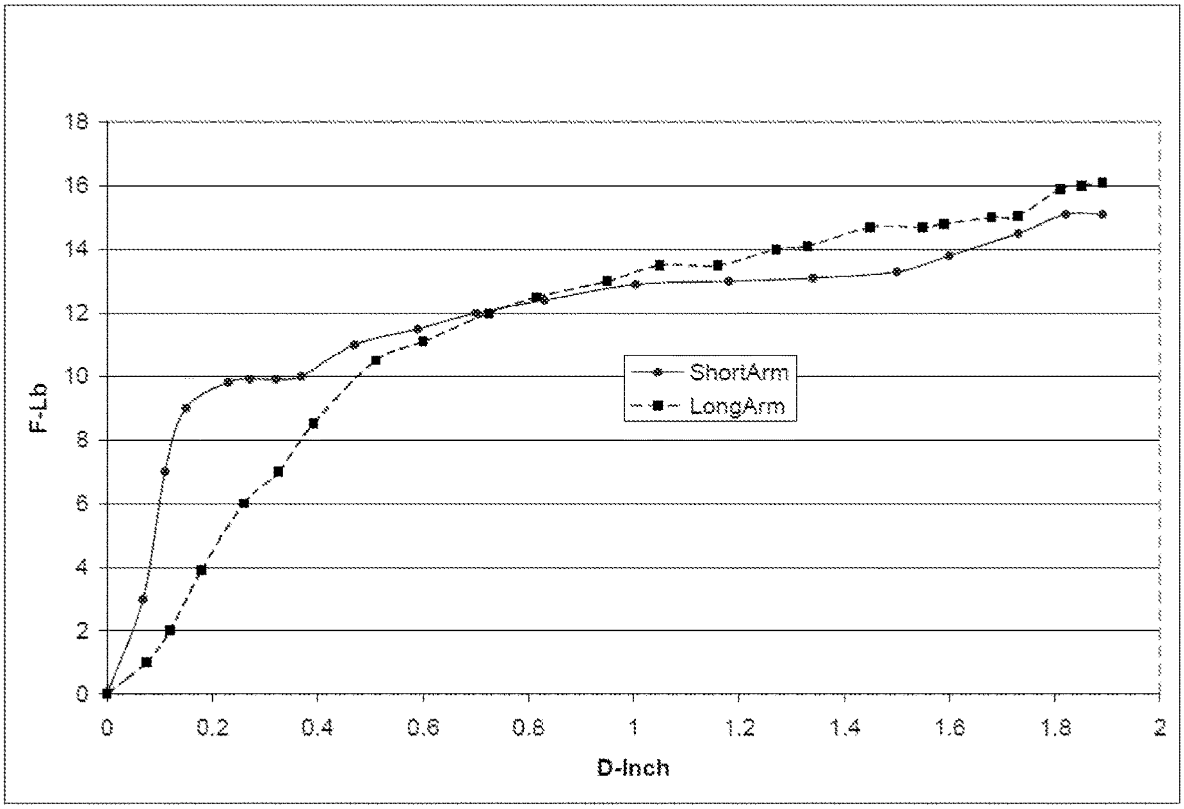
FIG. 35 is a handle force F (y axis) versus travel distance D (x axis) plot illustrating the performance advantages of a rigid handle-to-spring linkage.

FIG. 35 is an x-y plot depicting empirical observations of unexpected results and benefits of the rigid structure described above. The plot shows comparative test results from working models of torsion spring tackers with similar tacking performance. It is based on measurements of force F at the distal or rear end of a handle (y axis) versus the distance D (x axis) that the handle moves, with initial handle free play omitted, but "dead bounce" included. The areas under the respective curves correspond to energy stored in the power spring. The "Long Arm" sample plot has a first spring arm pressed in preload by a second arm about halfway between the coil and the striker, an arrangement that would have L2 and L3 of FIG. 1 being close in value. In contrast, the "Short Arm" sample plot has the ~80% ratio discussed above, being pressed in preload closer to the striker. A steep initial slope in the Short Arm plot indicates a stiff linkage with reduced dead bounce and a quick start to energy storage (as shown in phantom in FIG. 14B and discussed above). The shallower slope of the Long Arm plot shows extra flexing or give between the handle and the power spring. As seen, there is substantial wasted handle motion up to about 0.4 inches of travel for the Long Arm, so the Long Arm tacker requires a higher handle force for similar performance. Accordingly, the exemplary embodiment Short Arm tacker enjoys measurable performance advantages over Long Arm tacker designs.

The exemplary embodiments disclosed herein include a tensile link between the striker and the handle while enabling easy assembly of the tacker tool. This is further advantageous in that if the striker becomes stuck in a lower position, it is possible to forcibly move the striker upward by pulling the handle with a tensile force. As seen in FIG. 1, the link between link bar 60 and power spring 90 at hole 66 is inherently multi-directional. The next connection is between link bar 60 and lever 40. This connection is between pivot tab 45 and groove 65 of link bar 60. During assembly, lever 40 is rotated counterclockwise about this connection to engage tab 68 above catch 48. The tab and catch remain engageable for all operative positions—compare FIGS. 1 and 3A for example. There is a small clearance to tab 68 to ensure normal compressive operation has only pivot tab 45 and groove 65 engaged. When lever 40 is pulled upward, catch 48 presses tab 68 from below to pull link bar 60, and thus the power spring and striker, upward.

Re-set spring 190 biases the relevant moving parts toward the rest condition, FIGS. 1 and 2, in normal use. The re-set spring 190 pivots about leg 194 in hole 157 of absorber 150, as per FIGS. 1 and 15. In FIG. 2, absorber 150 is omitted to show underlying elements. In FIG. 4B, at its upper end, angled leg 193 engages opening 67 of link bar 60, with an angle of leg 193 biasing spring arm 192 to be retained in the opening.

The components including everything below link 30 are preferably initially assembled so that the lower tacker structure is complete, including both housing halves and front cover 12. Only parts associated with the handle remain to be attached so that there is no need to hold various lower parts in position as the handle is manipulated into the assembly. This eases assembly effort for volume production.

An upper subassembly includes handle 20, bumper 25, link support 28, latch bias spring 130, and link 30, as in FIGS. 1, 2. Latch bias spring 130 is supported about hinge pin 22 at spring coil 133 and held in position at rear end 134, as in FIG. 3A. These parts are pre-assembled to handle 20.

Link 30 hangs loosely from handle 20 about link hinge 22 before installation to the lower tool structure. In FIG. 2, link hinge pin 22 naturally forms a multidirectional link within respective holes of the two connected parts. Pin 22 also supports latch bias spring 130 in this pre-assembly. As the handle sub-assembly is installed, the elements of the lower structure are in the rest condition of FIG. 1. Latch 50 is placed atop lever 40 to rest against angled face 75 of striker 70, in the approximate position shown in FIG. 1. The tacker body and handle are positioned with the tool front angled upward to allow a lower end of link 30 to drop over hinge 43 at slot 33 of the link. Hinge pin 43 (FIGS. 3A, 10) is a pre-installed pin of lever 40. Rotating the link allows the handle to line up at hinge pin 110 at which point pin 110 is installed to support both latch 50 and handle 20. This process is demonstrated to be effective in a working model. In FIG. 3A, it is seen that rib 37 of the link now cooperates with lever tab 47 so that pulling up on handle 20 causes rib 37 to press tab 47 from below to transmit a jam-releasing tensile force. Therefore, the preferred embodiment tacker benefits from an anti-jam tensile force available to link striker 70 to handle 20 operated by the user. Optionally, some or all the functions of link support 28 may be integrated into a handle structure, for example, in association with a molded polymer composite handle. For example, recesses in sidewalls of the handle could support link hinge pin 22 with latch bias spring 130.

Figure 5A:
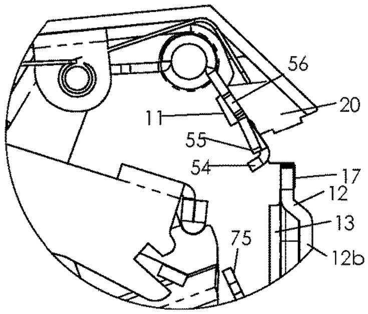
FIG. 5A is a detail view of a top front area of the tool of FIG. 5.

The staple is driven from the present invention tool, and now in a re-set action, striker 70 moves from its low released position of FIG. 5 to its upper rest position of FIG. 1. In FIG. 5A, it is seen that moving striker face 75 upward will cause latch 50 to rotate counterclockwise in the view. This cam action persists until latch tab 54 lines up with striker opening 74, such as FIG. 3A. Latch 50 then rotates clockwise under the bias of re-set spring 130 as the tab enters opening 74 to assume the position of FIG. 1. Latch 50 now selectively holds striker 70 in its upper position. Tabs 55 contact face 75 to hold latch 50 in a position in opening 74 that clears a radius at the base of tab 54, as in FIG. 1. In the conditions shown in FIGS. 5A and 6, striker 70 is down and out of engagement to latch 50. As handle 20 rises in the re-set stroke, the latch tends to rotate clockwise from re-set spring 130. In FIG. 3A, latch 50 has a stop against the housing formed by housing notch 11 against latch tab 56 to limit this rotation to the operative position shown in the drawing when the striker is not present. Thus, tab 54 of latch 50 remains in a position forward of face 75 whereby the re-set cam action of the latch and striker may occur.

Figure 13:
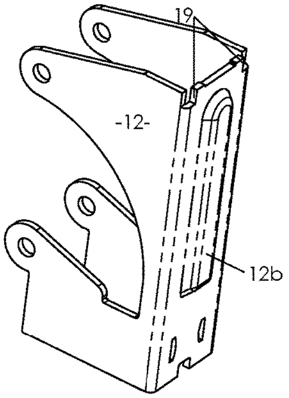
FIG. 13 is a top front perspective view of a front cover.
Figure 12:
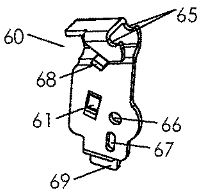
FIG. 12 is a front top perspective view of a link bar.
Figure 15:
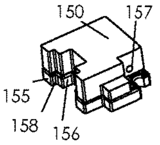
FIG. 15 is a top, front perspective view of an absorber assembly.

In FIG. 5, striker 70 includes a blade or plane defined by its position at 78 immediately in front of track 180. It is preferable to minimize any element of the tool that extends forward past this position 78 to ensure a staple can be installed reasonably near a confining wall, corner, or like obstruction. Further, a compact front of the tool maintains a beneficial line of sight for the user for aiming the tool. In FIGS. 1, 5A and 13, the tool includes an optional hump 12*b* in front cover 12 to clear power spring arm tip 95. Also handle 20 extends forward in its pressed position, FIG. 5A, but no farther than hump 12*b*. To limit the handle or like extension, latch 50 engages striker 70 at a position behind blade 78 of striker 70. To do this as seen in FIG. 4A, striker 70 includes a dogleg or offset bend 76 whereby opening 74 is preferably spaced rear of blade 78 or main striker structure. Latch 50 then may rest and move rearward of the blade and/or cover 12, as in FIG. 1. Latch 50 is located near or at a top of striker 70 as shown in FIGS. 1, 2. Latch 50 being disposed in the upper location of the tool is clear of the area occupied by re-set spring 190, absorber 150, and tabs 71, as discussed below. By utilizing this arrangement, there is abundant space in the front lower area of the housing behind the striker for these further parts to be assembled, to operate, and to function well.

Figure 6:
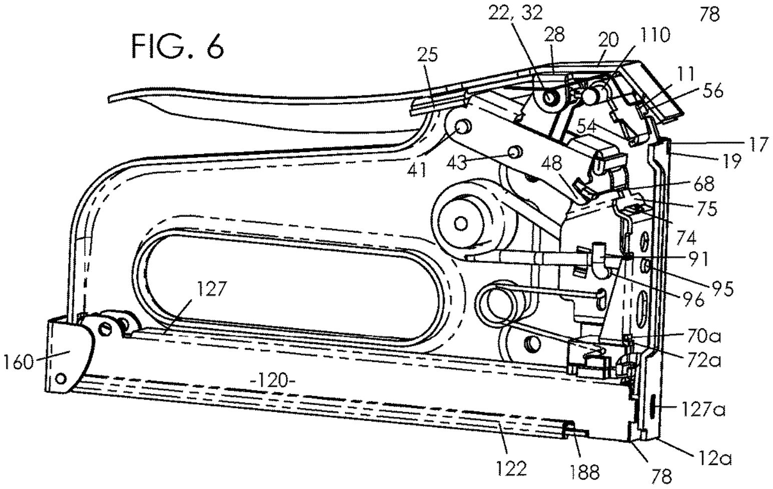
FIG. 6 is a front perspective view of the tool of FIG. 5.
Figure 7:
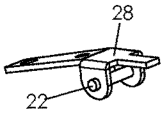
FIG. 7 is a front top perspective view of a handle link pivot support.
Figure 11:
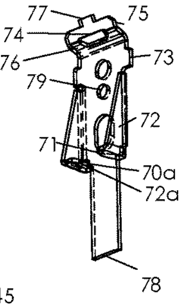
FIG. 11 is a rear bottom perspective view of a striker.
Figure 10:
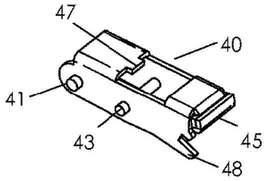
FIG. 10 is a top front perspective view of a lever.

In FIG. 2, to provide an impact stop against absorber 150, striker 70 includes horizontal tabs 71 bent from side walls 72. These tabs 71 contact absorber 150 in the low striker position of FIG. 5 where striker end 78 is at a bottom of the tacker body. In FIGS. 6, 11, to reinforce tabs 71, striker 70 includes extensions 72*a* in contact with blade 78 at 70*a* immediately above the tabs 71. These extensions 72*a* provide a direct force path from the moving bodies of striker 70 and power spring tip 95 to tabs 71 to reduce bending stresses on the blade structure where the tabs meet side walls 72.

It is common in a torsion spring tacker design that an absorber acts directly on an arm of the power spring—in particular, that a dry fire, without staples, has the absorber directly stopping an arm of the spring rather than the striker. This causes an undesirable reversal of forces in the spring arm type absorber. In normal use when the tool is fired, spring arm tip 95 presses down at the striker hole 79 (FIGS. 6, 11) to install staples. But with the spring arm to absorber contact structure in a dry fire there is a reversal of force at the spring arm/striker interface. The spring arms stops first, and the striker overshoots the spring arm a small distance at hole 79 and impacts the spring arm at the top of the hole to be indirectly stopped by the absorber.

This overtravel action causes wear at hole 79 from both top and bottom, leading to a stretched, distorted, or enlarged hole, added tensile stress on the striker, and increased vertical free play of the striker about the spring arm. In the extreme, the hole is so ovoid that spring arm will not be able to raise striker high enough to set the latch or reach a release height. As described herein, absorber 150 acts directly on striker 70. Therefore, striker 70 is always one of accelerating, pressing a staple, or pressing the absorber. Spring arm 94 at tip 95 thereby always presses down within hole 79 and thus wears the hole in only one direction with minimal tensile stress on the striker in this area. From empirical observations, this arrangement improves longevity and operating life of the tool.

Further, in the case of a spring wire/absorber interface, the wire spring arm provides a small impact target for the absorber leading to high stress in that contact area. In the present preferred embodiment, any target area on power spring arm 94 is further interrupted by the useful forward location of pivot element 96 at the front distal end of spring arm 92, corresponding to a short L2 length in FIG. 1. While keeping this segment L2 short, which is useful as discussed, it provides a small absorber target. With the absorber contact being against a structure of or affixed to the striker, the absorber can directly vertically underlie the distal end of arm 92, for example, at pivot element 96. As best seen in FIGS. 1 and 5, absorber 150 extends rearward of pivot element 96. This structure may be described as having an alignment along a vertical line of at least absorber 150 and the distal end of arm 92 with handle hinge 110 also preferably so aligned above absorber 150, and with spring coil 93 rearward of this alignment. In an alternative embodiment, there may be an additional or only absorber contacting arm 94 or other structures that move with the striker.

As shown in FIG. 11, the impact stop (horizontal tabs 71) are bent directly from the material of the striker 70 to preferably minimize weight and inertia of the reciprocating impact parts, although separate components may be used. It is desirable that the mass of the striker and any other parts that move in the impact or firing stroke be minimized. When these parts are kept light weight, the tacker installs staples and the like more effectively, especially when the tacker is actuated with a single hand. Consequently, the body including housing 10 will not jump substantially upward as the staple exits since the body is very heavy compared to the fast moving but light weight striker. This gives the user a damped, less jarring feel from the tool with reduced hand fatigue. As shown in FIG. 11, striker 70 includes optional openings above and below spring opening 79 to further reduce its weight.

Housing 10 preferably includes two halves. A left half is shown in the views of FIGS. 1 to 6. The halves must be secured in a properly spaced relation for effective tool function. In FIGS. 1 and 2, mandrel 106 is supported by pin 107. This pin 107 may be a screw or rivet to compress the housing about the mandrel. Mandrel 106 thus holds the housing securely spaced apart for operating clearance for spring 90 and further holds the housing halves from sliding relative to each other. At the lower front of the housing in FIGS. 1 and 2, plate 155 holds the housings apart while front cover 12 clamps the housing from in front. Housing plate 155 preferably supports rubber absorber 150 in an absorber assembly, shown in FIG. 15. In the cut away cross-section of FIG. 1, track chamber tab 129 extends within slot 156 of plate 155. FIG. 2 also shows these parts with absorber 150 omitted for clarity. Tab 129 in FIG. 1 provides an accurate rear limit position relative to track chamber 120 for striker 70 in its upper rest position. In FIG. 2, striker 70 is laterally positioned by edges 158 of plate 155. To register plate 155 to track chamber 120 laterally, tab 129 is a close fit in notch 156. Thus, there is essentially no tolerance build up from a more indirect link of the plate to the striker and track through the housing enclosure.

At the front top there is minimal room for a similar plate since, for example, latch 50 is advantageously located there. Preferably, as seen in FIGS. 6 and 13, front cover 12 includes registration notches 19 to cooperate with housing tabs 17 during assembly. With tabs 17 secure in notches 19, the housing is held accurately spaced part in this area.

In the drawings and disclosure, a single power spring is shown. In alternative embodiments, there may be two or more of such springs. For example, two coiled power springs 90 may be vertically stacked with a second mandrel 106 below the first mandrel, in front of grip opening 18 in housing 10. Pivot element 96 of this second spring engages a second link bar hole 66 (not shown) below the first. In this alternative embodiment, the horizontal distance between mandrel pin 107 and hole 66 (for both springs) is close to the same as that between hinge 41 and pivot tab 45. This ensures that pivot tab 45 and both holes 66 remain aligned through their motions to prevent binding. In another alternative embodiment, two power springs 90 may be installed side by side axially on a common mandrel 106. As with the other disclosed embodiments, power spring 90 is pivotally attached to the housing near or forward of a front of grip opening 18 whereby arms 92 and 94 form torque arms and extend from this position to striker 70. With relatively short torque arms, there is high force available at striker 70 for useful work, and further there is minimal vibration in the arm action as the short arms operate. If desired, longer arms may be used, with a more rearward mounting. Arm 94 may be described as a first spring arm while arm 92 may be described as a second spring arm.

In FIGS. 1A and 13, front cover 12 includes raised bottom front edge 12*a*. This raised portion may extend along the side walls of cover 12 rearward across striker slot 13. In use, a tacker is often held at an angle to the work with the rear end held up. With the clearance described here, the striker end 78 (FIG. 5) can still extend close to the work piece with front cover 12 out of the way. This front edge 12*a* may be raised by approximately 0.020 inch for example. With the light weight reciprocating compact parts discussed above and the tight contact here, ordinary stapling will easily produce driven staples that are flush with the work surface. Workpieces having such fully installed staples will hold the work more tightly and have a higher quality workmanship.

FIGS. 16 to 23 show a second exemplary embodiment of the present invention. Many elements may be shared with the first embodiment described above and the mechanical actions of power spring 90, striker 70 and latch 50*a* are or may be equivalent. Distance ratios described in connection with the first embodiment may be employed in this second embodiment as well. Also, the geometries that the handle should rigidly link to the power spring at a most forward position, proximate vertical line L, may be applied in this embodiment. Finally, the part count, friction, and complexity are or may be reduced in the second exemplary embodiment.

In FIG. 16, handle 20 to lever link 330 pivotally connects handle link support 328 to lever 340. Lever 340 directly engages pivot element 96 of power spring 90 at opening 366. Opening 366 may be elongated to provide for longitudinal (left-right on the page) motion of power spring 90 relative to lever 340 at this location. Lever pivot 341 operates rearward of spring coil 93 while lever 340 extends along a lever length forward past spring coil 93 to be disposed adjacent to striker 70. Link 330, at hinge 333, presses lever 340 at central lever pivot 343 toward a central location of the length of lever 340. Lever 340 is thus cantilevered forward from central lever pivot 343 to the spring location of preload on pivot element 96. In this manner, opening 366 is proximate the location of preload, being laterally adjacent (into the page of FIG. 16) along pivot element 96. At least one of spring arms 92 and 94 are likewise cantilevered forward from spring coil 93 whereby each of power spring 90 and lever 340 are cantilevered forward to the location of preload. As shown in FIGS. 16-18, both spring arms 92, 94 are so cantilevered.

The second exemplary embodiment depicted in FIGS. 16 to 23 may provide further reduced friction and increased rigidity over that of the first exemplary embodiment in FIGS. 1 to 6. While the first embodiment is substantially rigid, as seen in FIG. 35, the second embodiment has one less component between handle 20 and power spring 90, and thereby fewer pivotal or other connections to introduce flex or free play motions. Lever 340 is also longer than lever 40 and therefore rotates through a smaller angle about its rear pivot 341 to move power spring 90. From empirical observations, it is about 12 degrees for the second embodiment versus 20 degrees of pivoting for the first embodiment. With less motion there is less friction at the hinge of the rear pivot.

A similar effect operates when comparing the central pivots of 43 and 343, respectively. In FIG. 18, lever front opening 366 rotates in a same direction as spring pivot element 96 to reduce sliding there between, thereby reducing friction over the structure of FIG. 1 where link bar 60 does not substantially pivot along with pivot element 96. Whether considering the second embodiment, FIGS. 16 to 23, or the first embodiment of FIGS. 1 to 6, each provides substantial improvements and benefits in function and utility over the prior art, for example, through a rigid linking system as disclosed. According to this rigid linkage system, the lever front end presses the second arm at a lengthwise position substantially closer to the striker than to the spring mandrel center. This pressing occurs at a front end of lever 40, seen in FIG. 1, or lever 340, seen in FIG. 16.

The second embodiment of FIGS. 16 to 23 further enjoys simplified assembly. In FIGS. 19 and 23, link 330 is installed at hem 332 or equivalent structure into slots 329 of handle link support 328 while the parts are loose as depicted in FIGS. 20 and 21. Link support 328 is then fastened to handle 20 by riveting or the like, as in FIG. 16. Link 330 is thereby pivotally confined on handle 20. Hem or top end 332 presses and pivots against an underside of the handle as in FIG. 17. This pivoting is minimal, about 4 degrees as shown, so friction is low and slot 329 can be narrow. With the upper and lower respective assemblies prepared, seen in FIG. 18, the handle assembly is lowered into position as shown. Link 330 is held about at the angle shown to align with the front wall of notch 344. Link 330 is held out of the page in FIG. 18, and/or lever 340 pressed in, so that the link may pass beside lever 340 to assume the position of FIG. 19. In both FIGS. 18 and 19, handle 20 to body pivot 27 is forward of its final position. In FIGS. 21 and 22, tab 335 of link 330 can be seen able to enter notch 344 of lever 340. As seen in FIG. 19, handle 20 is then moved rearward to its final position at pivot 27 as link 330 rotates to be guided by edge 348. Edge 348 then locks link 330 laterally, in a notch of the link at tab 335, to a pivoting relation on the lever with respect to the side views. Link 330 holds lever 340 stable laterally through a triangular geometry "T", as seen in FIG. 23. Hem 332 presses inside handle 20 to form a stable base of the triangle. The pivoting is at link hinge 333 against central lever pivot 343, as seen comparing FIGS. 16 and 17. A tensile link between handle 20 and power spring 90 operates through link 330 at slot 329 and edge 348 to enable the handle to pull up on the spring and striker in an event of a staple jam or the like.

Spring arm tip 95 is preferably on center with respect to a front view to press striker 70 at its center line, although an off-center alignment can also be functional. Lever 340 therefore presses spring element 96 off center at pivot 366 in a similar position as link bar 60; see FIG. 4B for this analogous position at 66 in the first embodiment. Lever 340 is therefore preferably off center, into the page in FIG. 16, at its three operative pivots 341, 343, and 366 to form a stable plane of action. Segment 349 may be on center, out of the page in FIG. 18, to keep its optionally exposed portion at a clean joint line of housing 10.

In FIG. 16, latch 50*a* operates similarly to latch 50 as disclosed with the first embodiment. Rear end 53*a* selectively contacts handle 20 to cause the release action. In FIG. 19, link tab 322 supports latch bias spring 130 at coil 133.

Figure 31:
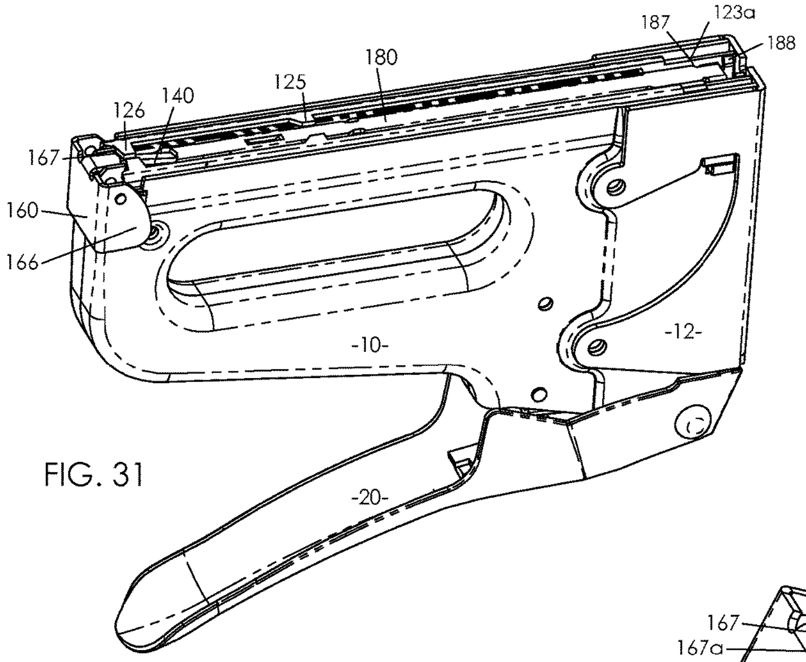
FIG. 31 is a bottom, side perspective view of a tacker inverted in position in preparation for bottom loading of staples and fasteners, with the track in its closed operative position.
Figure 32:
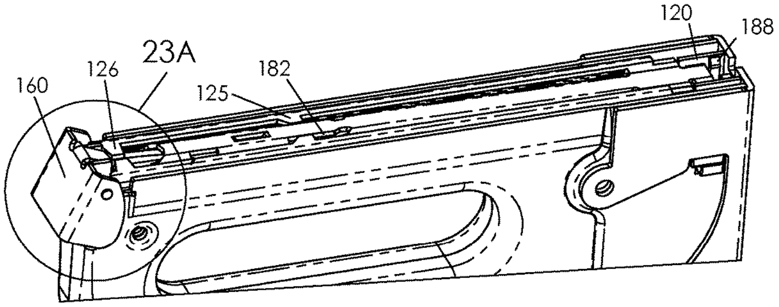
FIG. 32 is a cropped view of the tacker of FIG. 31 with the track pull de-latched.
Figure 33:
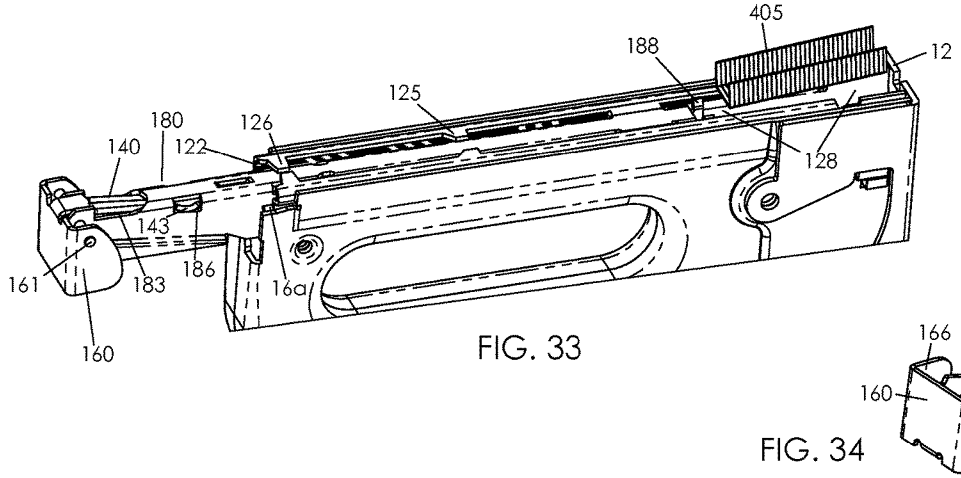
FIG. 33 is the tacker of FIG. 32 with the track partly opened to expose a staple loading chamber.

FIGS. 24 to 34 show an exemplary embodiment staple guide track and loading system preferably used with the first and second embodiment tackers described above while also providing advantage for use with other tacker devices. The subassembly shown provides for bottom loading staples or other fasteners, as in FIGS. 31-33. As seen in FIG. 33, track 180 selectively extends rearward to expose staple holding channel 128. The track can extend farther wherein track guide tab 188 contacts stop rib 125 of track chamber 120 or equivalent structure. Preferably, the full extension has tabs 188 at least about 4 inches rearward of front cover 12 to fit a standard staple rack 405 of that length. In FIG. 33, staple rack 405 is shown in position to be placed in track chamber 120. Rack 405 is shown as about half standard length corresponding to the partially extended track shown.

This exemplary embodiment bottom loading system is advantageous over a rear staple insertion system, because bottom loading keeps any staple readily accessible when needed. For example, it is much simpler to clear a staple jam or malfunction because, as seen in FIG. 33, the staple channel may be exposed for easy manipulation or extraction of such staples. In contrast, a rear loading system requires dismantling the track subassembly to access any jammed staples at the front of the tool.

The structure of the present track subassembly is suited for use with a sheet metal bodied tacker, although it is not limited to that application. For example, it may be used with die cast or molded bodied tackers. The preferred embodiment track subassembly includes closely integrated track pull 160 which de-latches track 180 from its operative position of FIGS. 24 and 31, for example, to its de-latched position of FIG. 25 through a simple pull rearward. Grasping and pulling track pull 160 (FIG. 27) causes it to rotate about pivot 161 against a bias from latch spring 140, discussed below, to the position of FIGS. 25 and 32A. Continuing the same pulling action causes track 180 to move to the extended position of FIG. 33 while the track pull preferably returns to its normal upright or equivalent position under the latch spring bias. Pushing track pull 160 inward, to the right in the views, moves track 180 to its closed, operative position as in FIG. 31. The track becomes latched to be retained in position while the track pull remains upright or otherwise in its normal position relative to the track through a latching action.

Figure 24:
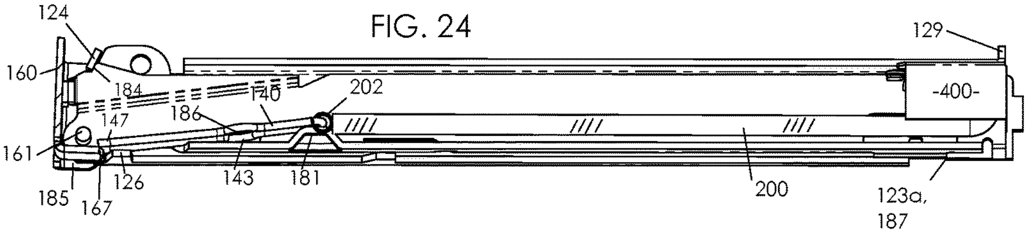
FIG. 24 is a side, bottom perspective view, partly in cross-section, of a track chamber subassembly.
Figure 25:
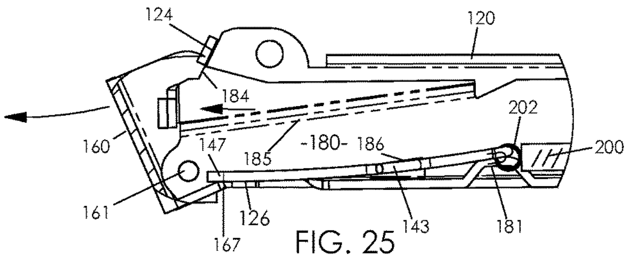
FIG. 25 is a rear detail view of the subassembly of FIG. 24 with the track in a de-latched condition and moving to open.
Figure 24A:
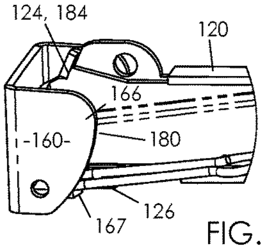
FIG. 24A is a top, side perspective detail view of the subassembly of FIG. 24.
Figure 27:
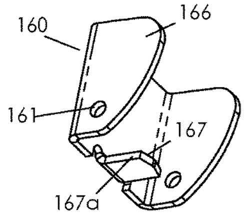
FIG. 27 is a bottom, front perspective view of a track pull.
Figure 28:
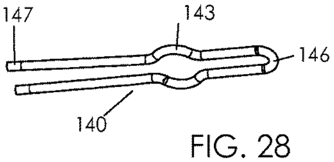
FIG. 28 is a bottom front perspective view of a track pull bias spring or latch spring.

The views of FIGS. 24 and 25 have track 180 and track chamber 120 shown in lengthwise cross-section to expose the internal workings. The latched track condition is seen in FIGS. 24 and 24A. Rib 184 of track 180 (see also FIG. 30) engages detent 124 of track chamber 120 or equivalent structure (housing 10, for example). In FIGS. 24 and 28, spring front end 146 is held on at track support 181 and held centrally at spring loop 143 by fulcrum 186. See also FIG. 33 for fulcrum 186. Latch spring 140 is therefore cantilevered at rear end 147. Cantilevered spring rear end 147 presses downward (upward in the page of the inverted views of FIGS. 31-33) on track spring contact tab 126, FIG. 24. This is beneficial because track 180 is thus resiliently urged upward relative to the track chamber to press track rib 184 against detent 124. Upward in this context means toward the handle from the track area for any view orientation. Preferably, track pull arm 167 also contacts spring end 147 in the fully closed track condition so that the track pull does not rattle.

Figure 34:
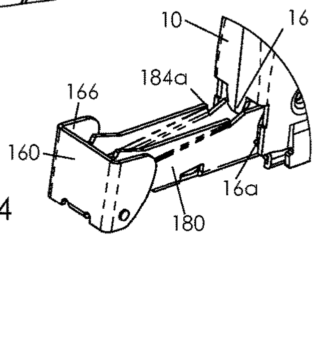
FIG. 34 is a detailed top rear perspective view of the tacker of FIG. 33, in the upright position.

Track pull 160 is pulled rearward to open track 180 to the position of FIGS. 33, 34. It is natural to squeeze and pull it at sides 166 or pull the front edge in this area, near part number "166" in FIG. 24A. Track pull 160 rotates about hinge 161 to the position of FIGS. 25, 25A. In FIG. 25, arm 167 has deflected spring 140 upward at end 147. Pulling outward on track 180, indicated by an arrow in FIG. 25, causes a downward bias on the track by a cam action from the angle of detent 124 and rib 184. Spring 140 does not resist this down motion since the spring is deflected off of tab 126 by arm 167. As a result, track 180 clears detent 124 as shown and is free to slide rearward to the position of FIG. 26.

It is not required that the track pull rotate to deflect the latch spring. Optionally, the track can be directly pulled down to deflect the spring and clear detent 124 before pulling out, for example, through a track pull interface that cannot rotate. While this optional structure does function, it requires two steps. In contrast, the preferred track pull 160 provides an automatic cam action that provides the down motion automatically through a single step of an intuitive outward pull. These features have been demonstrated in a working model.

Figure 32A:
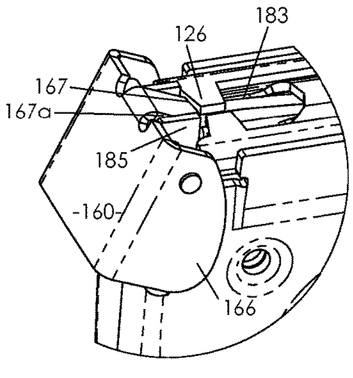
FIG. 32A is a detail view of the tacker of FIG. 32.

As best seen in FIG. 32A, track pull 160 is positioned laterally by arm edges 167*a* within track wall portions 185. The track pull is preferably a closely integrated fit to the housing body as seen in FIGS. 1 and 31. The tool maintains a clean profile in the rear area, being absent any track release access cavity, for example. Track pull 160 may include or comprise sheet metal, die cast, plastic molded construction, or any combination thereof. In any embodiment, the staple track remains easy to operate by a simple pulling action as discussed.

Figure 25B:
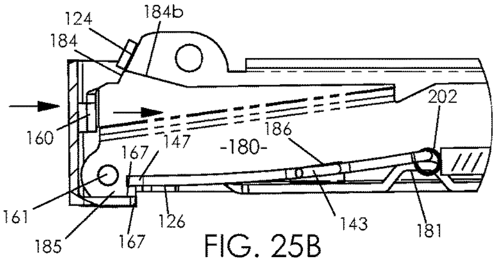
FIG. 25B is the view of FIG. 25A with the track moving to the closed position.
Figure 25A:
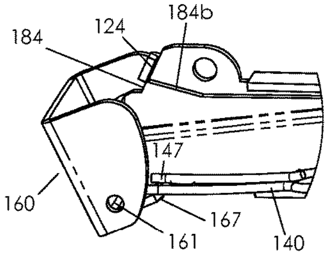
FIG. 25A is a top, side perspective detail view of the subassembly of FIG. 25.
Figure 29:
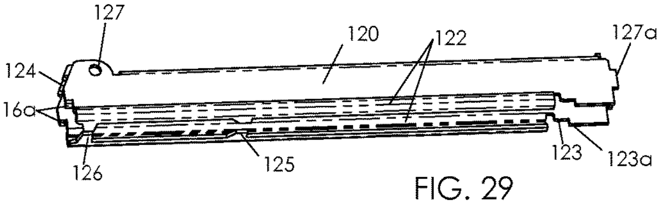
FIG. 29 is a side, bottom perspective view of track guide chamber.
Figure 30:
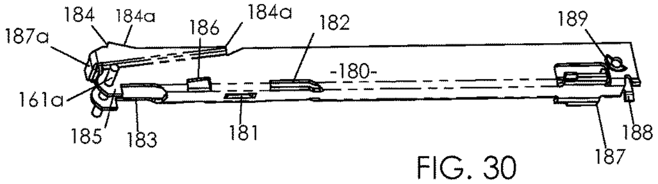
FIG. 30 is a side, bottom perspective view of a staple track.

As track 180 is closed, following the arrows in FIG. 25B, latch spring 140 is deflected by the cam action at detent 124 and rib 184*b* causing the track to move down toward tab 126. The tab deflects the spring and moves the spring away from arm 167. In this manner track pull 160 remains, or at least may remain, in its upright position as an operator pushes the track pull in a normal manner. If, for example, the track pull required rotating outward during this motion it would oppose the operator's inward pushing force and would tend to lock up the system. Instead, the track pull remains stable, the action intuitive, and the closing operation ends in a satisfying and positive click.

Latch spring 140 in FIG. 28 may be a simple wire form as shown. As discussed above, front spring end 146 rests on track support 181. Notch 186 in FIG. 33 forms a fulcrum to hold spring loops 143 whereby spring 140 is preferably preloaded in its rest condition of FIG. 24 to keep the track pull rattle free and to hold the track securely in the closed position. As further seen in FIGS. 24, 25, 25B, latch spring 140 is slightly bent concave upward from the preload so that it is in contact or near contact with both arm 167 and tab 126. Pusher spring 200 biases staple rack pusher 400 toward the front of the track, thus urging the staple rack toward the striker.

Pusher spring 200 is attached in a known manner to pusher 400. The rear end of pusher spring 200 is preferably fitted to latch spring 140 at loop 202 as shown in FIG. 25. To install the latch spring to the track, track spring 140 is inserted to loop 202 and then guided by grasping pusher spring 200. Latch spring 140 is pressed into the channel of track 180 to deflect the cantilevered arms of spring 140 toward each other. When loops 143 are aligned with notches 186, the latch spring snaps into position. This has been demonstrated in a working model. A pulley at recess 189 (FIG. 30) may guide the pusher spring at front. Recess 189 forms an upward facing edge to support a shaft of the pulley in the track channel. In this manner, the pulley can be installed from top into the channel to rest on the edges of recess 189 rather than being installed from a side.

In track 180, notches 182 provide clearance for stop ribs 125 as the track is deflected downward, this being up on the page in the inverted tool view of FIG. 32. As seen in FIG. 32, stop ribs 125 have entered notches 182. Similar clearance is created at notches 183 (FIG. 32A) to clear spring contact tab 126 as the track pull is deflected. Notches 182 and 183 preferably include a ramp at the front as shown so that ribs 125 and tabs 126 are guided out of the notch as the track moves outward.

In a front most position track foot 187 contacts stop edge 123*a*, as in FIGS. 29 to 32. Preferably, this contact is configured to hold pressure at the cam contact area of rib 184 and detent 124, i.e., the rear cam feature presses foot 187 against edge 123*a*. Track chamber tab 127*a* engages an opening of front cover 12 to hold a position of the track chamber at front, FIG. 127*a*. At rear the chamber is held to the housing by a fastener in hole 127. Side channels 122 of the track chamber guide track feet 187. At the rear end of the track, tabs 187*a* preferably fold across the track and may be spot welded or the like to reinforce the track structure. Ribs 125 and tabs 126 are formed as part of track chamber 120. The features of the track chamber may instead be formed from a structure of housing 10, for example, a sheet metal tab of the housing and the like for a steel housing.

Figure 26:
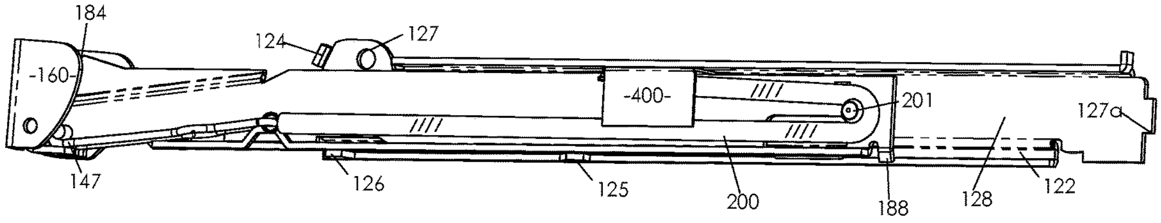
FIG. 26 is a side, front perspective view of the subassembly of FIG. 24 with the track pulled out for staple loading.

Staples are normally and properly installed into bottom-positioned staple channel 128, as in FIG. 33. However, it is possible that an operator may attempt to load the staples from top onto the exposed track of FIG. 34. In particular, if the staples are able to enter the housing or tool interior on the track from here, an operator may reasonably assume it is supposed to function this way. Of course, it cannot, as seen in FIG. 26; the staples would be rearward of pusher 400 with no way to reach the front of the track for use. Negative user reviews of products that have this defect affirm this issue.

To address improper staple loading, as seen in FIG. 34, there is an optional staple blocker 16 that protrudes into the channel of track 180. It is an element of housing 10 although other structures are contemplated. Also, it is both physically and visually clear to the user that installing staples from the rear is impossible, and the reason is readily seen. Installing this way is clearly improper, informing the user that the staples "go somewhere else" upon which the bottom staple channel is readily discovered. A blocking tab of the housing, or track chamber, may extend inward from a side to abut the outer side face of track 180 in this area. This is seen as tab 16*a* in FIG. 34. It is preferable that a blocker be visible at the tool exterior so that there is no ambiguity to the staple exclusion. Further, FIG. 34 shows optional track tab 184*a*. Track tab 184*a* extends outward whereby a staple rack cannot fit upon or past it. In the case of a full 4-inch staple rack, tab 184*a* makes it obviously impossible to place staples on the track from this direction. A shorter rack such as 2 inches may fit in the track portion in front of tabs 184*a*, but with tabs 184*a* and 16 collectively making placement here clearly impractical, the message to the user to look elsewhere in reinforced.

While the particular forms of the invention have been illustrated and described, it will be apparent that various modifications can be made without departing from the spirit and scope of the invention. It is contemplated that elements from one embodiment may be combined or substituted with elements from another embodiment.

The invention claimed is:

1. A fastening tool, comprising:

a housing with a top, bottom and sides, the housing extending longitudinally between a front and a rear;

a track chamber subassembly disposed along the bottom of the housing, the track chamber subassembly including a track, a track pull, and a pusher;

a striker disposed at the front of the housing including an upper striker position above the track and a lower striker position in front of the track;

the track including a closed operative track position and an open track position, the track being selectively latched to be retained in the closed operative track position, a track latch spring biasing the track to be latched, and the track extending rearward from the housing in the open track position;

a rear of the track being movable vertically within the track chamber as the track remains in a front position, a first vertical track position including the track engaging a detent of the track chamber, and a second vertical track position wherein the track is moved to disengage the dent;

a track pull pivotally attached to the rear of the track, the track pull including a normal position relative to the track, the track pull rotating from the normal position to a pivoted track pull position when the track pull is pulled rearward, and the track pull, when pulled to the pivoted track pull position, causes the track to move vertically within the track chamber to de-latch the track from the closed operative track position to a track de-latched position; and the track is movable horizontally rearward from the track de-latched position to the open track position.

2. The fastening tool of claim 1, wherein the track latch spring biases a rib of the track to engage a detent of the fastening tool, and rotating the track pull against a bias of the track latch spring causes the track latch spring to deflect, and upon deflection of the track latch spring the track is free to move clear of the detent without resistance from the track latch spring, and upon clearing the detent the track is free to slide rearward to the track open position.

3. The fastening tool of claim 2, wherein the track pull pivots upon a hinge and is separately movable from the rib of the track.

4. The fastening tool of claim 2, wherein the track pull is separately movable from the track latch spring.

5. The fastening tool of claim 1, wherein the track is movable vertically in the track chamber against the bias of the track latch spring, and when the track is so moved from the closed operative track position, the track becomes de-latched and free to slide rearward to the track open position.

6. The fastening tool of claim 5, wherein rotating the track pull causes the track pull to deflect the track latch spring by a cam action from the track pull, and the track is freed to move vertically in the track chamber when the track latch bias spring is deflected.

7. The fastening tool of claim 6, wherein the track is freed to move downward in the track chamber.

8. The fastening tool of claim 1, wherein the track comprises a channel, the fastening tool includes a staple blocker tab, and the staple blocker tab extends into the channel when the track is in the track open position.

9. The fastening tool of claim 1, wherein the track comprises wall portions of a channel, and a track tab extends outward from a top of the wall portion at the track tab whereby a rack of staples cannot fit upon the track channel at a location of the track tab.

10. A fastening tool, comprising:

a housing with a top, bottom and sides, the housing extending longitudinally between a front and a rear;

a track chamber subassembly disposed along the bottom of the housing, the track chamber subassembly including a track, a track pull, and a pusher;

a striker disposed at the front of the housing including an upper striker position above the track and a lower striker position in front of the track;

the track including a closed operative track position and an open track position, the track extending rearward from the housing in the open track position, a detent of the fastening tool selectively retaining the track in the closed operative track position;

a track bias spring biasing the track to be retained in the closed operative track position, the track being movable vertically within the track chamber at a rear of the track from the closed operative track position to a de-latched position cleared of the detent, and the cleared track is free to slide to the open track position upon the rear of the track moving vertically; and the track pull pivotally attached to a rear of the track, the track pull including a normal position relative to the track, the track pull rotating from the normal position to a pivoted track pull position, the track pull is selectively linked to the track bias spring whereby the track pull, in the pivoted track pull position, causes the track bias spring to deflect as the rear of the track moves vertically to de-latch the track from the closed operative track position to the track de-latched position.

11. The fastening tool of claim 10, wherein the track pull includes an arm, and the arm contacts and deflects the track bias spring when the track pull is pivoted.

12. The fastening tool of claim 10, wherein the track pull pivots rearward from the normal position to the pivoted track pull position and an automatic cam action frees the track to move vertically to the track de-latched position.

13. The fastening tool of claim 10, wherein the rear of the track moves downward in the track chamber to become de-latched.

14. The fastening tool of claim 10, wherein the track pull remains in the normal position when the track is pushed to the closed operative track position in a track closing operation.

15. The fastening tool of claim 10, wherein the detent includes an angled portion comprising a cam, and the track bias spring presses a rib of the track against the cam to cause the track to be pressed against an edge of the fastening tool in a front most track position.

16. A fastening tool, comprising:

a housing with a top, bottom and sides, the housing extending longitudinally between a front and a rear;

a track chamber subassembly disposed along the bottom of the housing, the track chamber subassembly including a track, a track pull, and a pusher;

a striker disposed at the front of the housing including an upper striker position above the track and a lower striker position in front of the track;

the track including a closed operative track position and an open track position, the track extending rearward from the housing in the open track position, a detent of the fastening tool selectively retaining the track in the closed operative track position;

a track bias spring biasing the track to be retained in the closed operative track position, the track being movable vertically within the track chamber at a rear of the track from the closed operative track position to a de-latched position cleared of the detent and the cleared track is free to slide to the open track position upon the rear of the track moving vertically; and the track pull pivotally attached to a rear of the track, the track pull including a normal position relative to the track, the track pull rotating from the normal position to a pivoted track pull position, the track pull is selectively linked to the track bias spring whereby the track pull, in the pivoted track pull position, causes the track bias spring to deflect as the rear of the track moves vertically to de-latch the track from the closed track operative position to the track de-latched position, wherein the track pull rotates about a hinge between the normal position of the track pull and the pivoted track pull position.

17. The fastening tool of claim 16, wherein the track pull remains in the normal position when the track is pushed to the closed operative track position in a track closing operation.

18. The fastening tool of claim 16, wherein an automatic cam action frees the track to move vertically to the track de-latched position when the track pull is pulled rearward.

* * * * *